(12) United States Patent
Pavate et al.

(10) Patent No.: US 9,361,573 B2
(45) Date of Patent: Jun. 7, 2016

(54) PRINTED ANTENNAS, METHODS OF PRINTING AN ANTENNA, AND DEVICES INCLUDING THE PRINTED ANTENNA

(71) Applicant: Thin Film Electronics ASA, Oslo (NO)

(72) Inventors: Vikram Pavate, San Mateo, CA (US); Criswell Choi, Menlo Park, CA (US)

(73) Assignee: Thin Film Electronics ASA, Oslo (NO)

( * ) Notice: Subject to any disclaimer, the term of this patent is extended or adjusted under 35 U.S.C. 154(b) by 0 days.

(21) Appl. No.: 14/599,972

(22) Filed: Jan. 19, 2015

(65) Prior Publication Data
US 2015/0129667 A1   May 14, 2015

Related U.S. Application Data

(63) Continuation of application No. 12/625,439, filed on Nov. 24, 2009, now Pat. No. 9,016,585.

(60) Provisional application No. 61/117,830, filed on Nov. 25, 2008.

(51) Int. Cl.
*G06K 19/06* (2006.01)
*G06K 19/077* (2006.01)
*H01Q 1/22* (2006.01)
(Continued)

(52) U.S. Cl.
CPC .... *G06K 19/07783* (2013.01); *G06K 19/07749* (2013.01); *H01Q 1/2208* (2013.01); *H01Q 1/2225* (2013.01); *H01Q 7/00* (2013.01); *H01Q 23/00* (2013.01); *Y10T 29/49018* (2015.01)

(58) Field of Classification Search
None
See application file for complete search history.

(56) References Cited

U.S. PATENT DOCUMENTS

| 4,233,830 A | 11/1980 | Houdion |
| 4,666,735 A | 5/1987 | Hoover et al. |

(Continued)

FOREIGN PATENT DOCUMENTS

| EP | 1453088 A2 | 9/2004 |
| EP | 1952316 B1 | 6/2008 |

(Continued)

OTHER PUBLICATIONS

Office Action from the Japanese Patent Office for Japanese Patent Application No. 2011-537726 dated Oct. 14, 2014 with a partial English translation; 3 pgs.
Abstract of JP2007172592 (A); "Semiconductor Device"; Jul. 5, 2007; Toshihiko Saito, Kiyoshi Kato, and Takenao Sato; 2 pgs.; http://worldwide.espacenet.com.
Extended European Search Report; European Pat. Appl. No. 09832350.4; Dec. 2, 2013; 6 pgs.
Abstract of JP2000113147 (A); "IC Card and Its Manufacture"; Apr. 21, 2000; Suzuki Masakatsu and Kaneko Kazuo; 2 pgs.; http://worldwide.espacenet.com.

(Continued)

*Primary Examiner* — Michael G Lee
*Assistant Examiner* — Tabitha Chedekel
(74) *Attorney, Agent, or Firm* — Andrew D. Fortney; Central California IP Group, P.C.

(57) ABSTRACT

Wireless devices such as sensors, interactive displays and electronic article surveillance (EAS) and/or radio frequency identification (RFID) tags including integrated circuitry and an antenna and/or inductor printed thereon, and methods for making and using the same, are disclosed. The device generally includes an integrated circuit on a substrate and an antenna, directly on the substrate and/or the integrated circuit, in electrical communication with the integrated circuit. The method of making a wireless device generally includes forming an integrated circuit on the substrate and printing at least part of an antenna or antenna precursor layer on the integrated circuit and/or substrate. The present invention advantageously provides a low cost wireless device capable of operating at MHz frequencies that can be manufactured in a shorter time period than conventional devices.

20 Claims, 6 Drawing Sheets

(51) Int. Cl.
*H01Q 7/00* (2006.01)
*H01Q 23/00* (2006.01)

(56) References Cited

U.S. PATENT DOCUMENTS

| | | | |
|---|---|---|---|
| 5,081,445 | A | 1/1992 | Gill et al. |
| 5,099,225 | A | 3/1992 | Narlow et al. |
| 5,111,186 | A | 5/1992 | Narlow et al. |
| 5,218,189 | A | 6/1993 | Hutchison |
| 5,257,009 | A | 10/1993 | Narlow |
| 5,510,769 | A | 4/1996 | Kajfez et al. |
| 5,528,222 | A | 6/1996 | Moskowitz et al. |
| 5,608,246 | A | 3/1997 | Yeager et al. |
| 5,612,235 | A | 3/1997 | Wu et al. |
| 5,658,808 | A | 8/1997 | Lin |
| 5,796,121 | A | 8/1998 | Gates |
| 5,821,137 | A | 10/1998 | Wakai et al. |
| 5,841,350 | A | 11/1998 | Appalucci et al. |
| 5,861,809 | A | 1/1999 | Eckstein et al. |
| 5,989,944 | A | 11/1999 | Yoon |
| 6,091,332 | A | 7/2000 | Eberhardt et al. |
| 6,091,607 | A | 7/2000 | McKeown et al. |
| 6,094,138 | A | 7/2000 | Eberhardt et al. |
| 6,100,804 | A | 8/2000 | Brady et al. |
| 6,147,605 | A | 11/2000 | Vega et al. |
| 6,246,327 | B1 | 6/2001 | Eberhardt |
| 6,274,412 | B1 | 8/2001 | Kydd et al. |
| 6,294,401 | B1 | 9/2001 | Jacobson et al. |
| 6,348,295 | B1 | 2/2002 | Griffith et al. |
| 6,379,745 | B1 | 4/2002 | Kydd et al. |
| 6,400,271 | B1 | 6/2002 | Davies, Jr. et al. |
| 6,509,217 | B1 | 1/2003 | Reddy |
| 6,518,087 | B1 | 2/2003 | Furusawa et al. |
| 6,535,108 | B1 | 3/2003 | Schrott et al. |
| 6,541,354 | B1 | 4/2003 | Shimoda et al. |
| 6,665,193 | B1 | 12/2003 | Chung et al. |
| 6,693,541 | B2 | 2/2004 | Egbert |
| 6,765,249 | B2 | 7/2004 | Voutsas et al. |
| 6,767,775 | B1 | 7/2004 | Yudasaka et al. |
| 6,816,380 | B2 | 11/2004 | Credelle et al. |
| 6,882,545 | B2 | 4/2005 | Akita et al. |
| 6,891,110 | B1 | 5/2005 | Pennaz et al. |
| 6,940,408 | B2 | 9/2005 | Ferguson et al. |
| 6,951,596 | B2 | 10/2005 | Green et al. |
| 7,064,015 | B2 | 6/2006 | Azuma |
| 7,152,804 | B1 | 12/2006 | MacKenzie et al. |
| 7,224,280 | B2 | 5/2007 | Ferguson et al. |
| 7,260,882 | B2 | 8/2007 | Credelle et al. |
| 7,292,148 | B2 | 11/2007 | Forster |
| 7,359,823 | B2 | 4/2008 | Forster |
| 7,387,260 | B1 | 6/2008 | MacKenzie et al. |
| 7,619,248 | B1 | 11/2009 | Cleeves |
| 9,016,585 | B2 * | 4/2015 | Pavate .............. G06K 19/07749 235/487 |
| 2001/0002826 | A1 | 6/2001 | Tuttle et al. |
| 2001/0040507 | A1 | 11/2001 | Eckstein et al. |
| 2002/0163434 | A1 | 11/2002 | Burke |
| 2002/0192856 | A1 | 12/2002 | Halope et al. |
| 2003/0108664 | A1 | 6/2003 | Kodas et al. |
| 2003/0197656 | A1 | 10/2003 | Yang et al. |
| 2004/0053431 | A1 | 3/2004 | Chang et al. |
| 2004/0164302 | A1 | 8/2004 | Arai et al. |
| 2004/0189625 | A1 | 9/2004 | Sato |
| 2005/0026317 | A1 | 2/2005 | Sirringhaus et al. |
| 2005/0130389 | A1 | 6/2005 | Yamazaki et al. |
| 2005/0133790 | A1 | 6/2005 | Kato |
| 2005/0134435 | A1 | 6/2005 | Koyama et al. |
| 2005/0134463 | A1 | 6/2005 | Yamazaki |
| 2005/0136358 | A1 | 6/2005 | Paul et al. |
| 2005/0140495 | A1 | 6/2005 | Yamazaki et al. |
| 2005/0148121 | A1 | 7/2005 | Yamazaki et al. |
| 2005/0181566 | A1 | 8/2005 | Machida et al. |
| 2005/0198811 | A1 | 9/2005 | Kurz et al. |
| 2005/0200684 | A1 | 9/2005 | Sakurada et al. |
| 2005/0214688 | A1 | 9/2005 | Yamamoto et al. |
| 2005/0263767 | A1 | 12/2005 | Yamazaki et al. |
| 2005/0272244 | A1 | 12/2005 | Wada |
| 2006/0211187 | A1 | 9/2006 | Choi et al. |
| 2006/0270191 | A1 | 11/2006 | Tamura et al. |
| 2007/0007342 | A1 | 1/2007 | Cleeves et al. |
| 2007/0017983 | A1 | 1/2007 | Frank et al. |
| 2007/0090955 | A1 | 4/2007 | Cote et al. |
| 2007/0273515 | A1 | 11/2007 | MacKenzie et al. |
| 2008/0184550 | A1 | 8/2008 | Hwan et al. |

FOREIGN PATENT DOCUMENTS

| | | |
|---|---|---|
| EP | 1978472 A2 | 10/2008 |
| JP | 2000-113147 A | 4/2000 |
| JP | 2006-191001 A | 7/2006 |
| JP | 2007-172592 A | 7/2007 |
| JP | 2008-277798 A | 11/2008 |
| WO | 01/46987 A2 | 6/2001 |
| WO | 2005/062388 A1 | 7/2005 |
| WO | 2006/062175 A1 | 6/2006 |
| WO | 2006/116551 A1 | 11/2006 |

OTHER PUBLICATIONS

Abstract of JP2006191001 (A); "Semiconductor Device and Its Manufacturing Method"; Jul. 20, 2006; Moriya Yoshitaka, Abe Hiroko, Yugawa Mikio and Nomura Ryoji; http://worldwide.espacenet.com.

Abstract of JP2008277798 (A); "Semiconductor Device, and Manufacturing Method Thereof"; Nov. 13, 2008; Yamazaki Shunpei; 2 pgs.; http://worldwide.espacenet.com.

Office Action from the Japanese Patent Office for Japanese Patent Application No. 2011-537726 dated Apr. 2, 2014; 3 pgs.

Chinese Office Action with English translation dated Feb. 4, 2013; Chinese Patent Application No. 200980146686.2; 7 pgs.; The State Intellectual Property Office of the P.R.C., People's Republic of China.

PCT International Preliminary Report on Patentability; PCT International Application No. PCT/US09/065818; Dated Dec. 15, 2011; 6 pages; The International Bureau of WIPO, Geneva, Switzerland.

PCT International Search Report and Written Opinion; PCT International Searching Authority/US; International Application No. PCT/US2009/065818; Dated Jan. 26, 2010; 6 pages; International Searching Authority/United States, Commissioner for Patents; Alexandria, Virginia.

Korean Office Action with a partial English translation dated Sep. 25, 2009; Korean Patent Application No. 10-2007-0086960; 5 pgs.; Korean Intellectual Property Office, Republic of Korea.

International Search Report, PCT Application No. PCT/US 08/79653; Dated Dec. 18, 2008; 2 pages; International Searching Authority/United States, Commissioner for Patents, Alexandria, Virginia.

Written Opinion, PCT Application No. PCT/US 08/79653; 5 pages; International Searching Authority/United States, Commissioner for Patents, Alexandria, Virginia.

Dave Treleaven and Dick James; "Integrated Circuit Passive Components"; Obtained from www.chipworks.com; 4 pages.

Zhibin Xiong, Haitao Liu, Chunxiang Zhu and Johnny K. O. Sin; "A Novel Self-Aligned Offset-Gated Polysilicon TFT Using High-k Dielectric Spacers"; IEEE Electron Device Letters, vol. 25, No. 4, Apr. 2004; pp. 194-195.

J.H. Lee, K.C. Moon, B.H. You and M.K. Han; "The Improvement of Reliability in the Poly-Si TFTs Employing Laser Irradiation on Gate Oxide"; AM-LCD '03, pp. 169 et seq. (TFTp3-3).

Hongmei Wang, Singh Jagar, Sang Lam and Mansun Chan; "High Frequency Performance of Large-Grain Polysilicon-on-Insulator MOSFETs"; IEEE Transactions on Electron Devices, vol. 48, No. 7, Jul. 2001; pp. 1480-1482.

* cited by examiner (Background Art)

PRINTED ANTENNAS, METHODS OF PRINTING AN ANTENNA, AND DEVICES INCLUDING THE PRINTED ANTENNA

RELATED APPLICATIONS

This application is a continuation of U.S. patent application Ser. No. 12/625,439, filed Nov. 24, 2009, pending, incorporated herein by reference in its entirety, which in turn claims the benefit of U.S. Provisional Patent Application No. 61/117,830, filed Nov. 25, 2008, which is incorporated herein by reference in its entirety.

FIELD OF THE INVENTION

The present invention generally relates to the field of wireless devices such as sensors and electronic article surveillance (EAS), radio frequency (RF) and/or identification (ID) tags. More specifically, embodiments of the present invention pertain to tags/devices utilizing an integrated circuit with an antenna printed thereon, and methods for their manufacturing and/or production.

DISCUSSION OF THE BACKGROUND

Remotely powered electronic devices and related systems are known. For example, U.S. Pat. No. 5,099,227, issued to Geiszler et al. and entitled "Proximity Detecting Apparatus," discloses a remotely powered device which uses electromagnetic coupling to derive power from a remote source, then uses both electromagnetic and electrostatic coupling to transmit stored data to a receiver, often collocated with the remote source. Such remotely powered communication devices are commonly known as radio frequency identification ("RFID") tags.

RFID tags and associated systems have numerous applications. For example, RFID tags are frequently used for personal identification in automated gate sentry applications, protecting secured buildings or areas. These tags often take the form of access control cards. Information stored on the RFID tag identifies the tag holder seeking access to the secured building or area. Older automated gate sentry applications generally require the person accessing the building to insert or swipe their identification card or tag into or through a reader for the system to read the information from the card or tag. Newer RFID tag systems allow the tag to be read at a short distance using radio frequency data transmission technology, thereby eliminating the need to insert or swipe an identification tag into or through a reader. Most typically, the user simply holds or places the tag near a base station, which is coupled to a security system securing the building or area. The base station transmits a signal to the tag that powers circuitry contained on the tag. The circuitry, in response to the signal, communicates stored information from the tag to the base station, which receives and decodes the information. The information is then processed by the security system to determine if access is allowed or appropriate. Also, RFID tags may be written (e.g., programmed) and/or deactivated remotely by an excitation signal, appropriately modulated in a predetermined manner.

Some conventional RFID tags and systems use primarily electromagnetic coupling to remotely power the remote device and couple the remote device with a reader (e.g., an emitter system and a receiver system). The reader (e.g., the emitter system) generates an electromagnetic excitation signal that powers up the device and causes the device to absorb, re-radiate or backscatter a signal which may include stored information. A receiver on the reader receives the signal produced by the remote device.

Traditional RFID manufacturing processes generally require a direct die attach to either a 3-layer antenna or to a strap that is then attached to a single layer antenna. The direct die attach process, an example of which is shown in FIGS. 1A-1B, is a relatively slow process, which can make it relatively expensive for a given throughput. The size of the die is limited, and the relatively small die dimensions result in a need for higher accuracy pick and place systems, which further increases costs.

Referring to FIG. 1A, conventional RFID tags are formed by a process that includes dicing a wafer manufactured by conventional wafer-based processes into a plurality of die. A die is then placed onto an antenna or inductor carrier (which may contain an antenna, inductor coil or other conducting feature) in a chip-to-antenna attach process. Alternately, the die can be attached to an intermediate carrier (or strap) in a two-step chip-to-strap/strap-to-antenna attach process.

In the two-step process, a die 120 is attached to a strap (or carrier) 140. Electrical paths 130 and 132 from the die 120 to relatively larger and/or more widely distributed areas (e.g., 134 or 136) for attaching ends of the antenna are present in certain locations on the strap 140. This assembly may then be attached as shown in FIG. 1B to a support film 150 containing inductor/antenna 152. Because the pads 134 and 136 (together with the paths 130 and 132 and the die 120) connect the ends of the antenna 152, the assembly on the strap 140 is sometimes known as a "strap." This attach process may include various physical bonding techniques, such as gluing, as well as establishing electrical interconnection(s) via wire bonding, anisotropic conductive epoxy bonding, ultrasonics, bump-bonding or flip-chip approaches. Also, the attach process often involves the use of heat, time, and/or UV exposure. Since the die 120 is usually made as small as possible (<1 mm$^2$) to reduce the cost per die, the pad elements for external electrical connections to the die 120 may be relatively small. This means that the placing operation should be of relatively high accuracy for high speed mechanical operation (e.g., placement to within 50 microns of a predetermined position is often required).

Manufacturing conventional RFID devices using the strap attach process also has cost limitations because the process inherently requires the same die attach process as the direct die-to-antenna attach process to place the die on the strap. The strap attach process also introduces additional process steps, which result in lower yields and higher costs.

Some RFID manufacturing processes use a printed integrated circuit (PIC). The printed integrated circuit is generally larger than a photolithographically-produced die on a single-crystal substrate (e.g., a silicon wafer). The relatively large size of the printed integrated circuit (e.g., >1 mm$^2$) enables direct die attachment to (or placement on) a single layer antenna. An example of this process is shown in FIGS. 2A-2B (see, e.g., U.S. Pat. No. 7,152,804). The cost of direct die attachment of large printed integrated circuits is generally lower than traditional pick-and-place die attachment. However, the cost of certain adhesives and/or of crimping or welding processes may still be higher than desired.

FIG. 2A shows tag precursor 200, comprising strap or interposer 232, having thereon pads 234 and 236 and integrated circuitry 210. Generally, integrated circuitry 210 is formed on a first major surface of strap 232. The integrated circuitry 210 can be realized as a printed inorganic circuit, largely using the techniques described in U.S. patent application Ser. Nos. 10/885,283 and 11/104,375, filed on Jul. 6, 2004 and Apr. 11, 2005, respectively, the relevant portions of which are incorporated herein by reference. Holes or vias (not shown in the Figures) may be formed in the major surface of substrate 232 opposite that on which pads 234 and 236 and integrated circuitry 210 have been formed, if backside attachment to the antenna is to be performed.

FIG. 2B shows an antenna and/or inductor carrier 250, comprising carrier 250 and an antenna and/or inductor 252 thereon. Generally, the antenna and/or inductor 252 are formed on a first major surface of carrier 250. The antenna and/or inductor 252 can be realized as an etched structure on a dielectric substrate, a plated structure, or a printed structure. As shown in FIG. 2B, the strap/interposer 232 can be attached to the carrier 250 containing the inductor/antenna 252 such that electrical connections are formed between pads 234 and 236 and terminals of antenna/inductor 252 at locations corresponding to the holes or vias (not shown) in substrate 232. Alternatively, the carrier/strap 232 and the carrier 250 can be attached face-to-face, such that direct electrical connections are made between the pads 234 and 236 and terminals of antenna/inductor 252. This carrier-based process may have advantages for flip-chip or bump bonding approaches, where the small pad dimensions and relatively small pitch between adjacent pads may make it more expensive or disadvantageous to implement bumps, balls and/or other interconnect elements onto the integrated circuit, the pads 234 and 236, and/or the inductor/carrier substrate 250 by conventional means.

Conventional RFID manufacturing processes generally use either a relatively complex chip-to-antenna attach process (not shown in the Figures) or a two-step chip-to-strap/strap-to-antenna attach process, as shown in FIGS. 1A-1B. Either process requires high-precision pick-and-place equipment for the chip attach. The high precision pick-and-place equipment has a relatively high capital cost and is typically slower than lower precision equipment. Also, the process of picking out a separated (sawn) die 120 (FIG. 1A), moving it to the strap 140 to which it is to be bonded, accurately placing it in its appropriate location, and making the physical and electrical interconnections can be a relatively slow process. As a result, the conventional attach process has a proportionately high cost relative to the overall manufacturing cost.

In the case of a process that uses a strap or interposer (e.g., strap 232 in FIG. 2B), cost and throughput advantages are achieved by first forming the integrated circuit 210 on a continuous or discrete process sheet, and individual carriers/straps 232 are formed therefrom by singulation. Relatively large and more widely distributed pads 234, 236 can be formed in other locations on the carrier 232 to allow high-throughput, low resolution attachment operations such as crimping or conductive adhesive attach to the substrate 250 and antenna 252. Electrical paths from the integrated circuit 210 to the pads 234, 236 can be formed simultaneously with the pads 234, 236.

The price of tags is a significant focus within the RFID industry. High RFID tag prices have been an obstacle against widespread adoption of RFID technology, especially in item-level retail applications and other low-cost, high-volume applications. One way of reducing wireless device (e.g., RFID tag) costs is to develop a tag structure and process that incorporates (and preferably integrates) a less expensive substrate, simplifies or eliminates any attach processes, a stable and effective antenna, and printed front end devices and logic circuitry.

SUMMARY OF THE INVENTION

Embodiments of the present invention relate to wireless devices such as sensors and RFID tags having an antenna and/or inductor that is printed directly on the integrated circuit and/or substrate, and methods for their manufacture and use. The device generally comprises (a) an integrated circuit on a substrate; and (b) an antenna, directly on the substrate and/or the integrated circuit, in electrical communication with the integrated circuit. The method of manufacturing generally comprises (1) forming an integrated circuit on a substrate; and (2) printing an antenna or antenna precursor layer on the integrated circuit and/or the substrate, the antenna being in electrical communication with the integrated circuit.

Various embodiments of the present invention relate to printed wireless integrated circuits (e.g., sensors, displays, tags having one or more RF, HF, VHF, UHF, and/or electronic article surveillance [EAS] functions, and other articles of manufacture that send and/or receive wireless signals, etc.). Printing has potential cost advantages for manufacturing such integrated circuits, since printing increases the efficiency of materials utilization (e.g., by additive or semi-additive processing), combines deposition and patterning steps eliminating expensive subtractive step in conventional processing, and leverages low capital expenditures and operating costs for processing equipment. The materials efficiency and additive processing enable a lower cost per unit area for the processed carriers, as well as low cost attach processing and/or integration of passive devices with the active circuitry. Furthermore, high throughput conventional printing processes can be adapted to flexible substrates (e.g., a plastic sheet or a metal foil), thereby improving and/or expanding uses of wireless devices in a number of applications. Also, maskless processes such as printing enable facile customization of devices (e.g., wireless RF), for example where each individual RF device is provided with a unique identification code and/or a unique response time delay with respect to a reader inquiry. Furthermore, if an antenna can be printed in a manner that facilitates the direct placement of the printed antenna on an integrated circuit and/or a substrate containing the integrated circuit, the cost of the antenna "attach" process can be reduced significantly.

The use of printing technology and ink facilitates the manufacturing of a low cost, but relatively large, printed integrated circuit (PIC). To improve yield and/or further reduce cost, at least part of an antenna or antenna precursor layer can be printed directly onto the printed integrated circuit and/or the substrate on which the printed integrated circuit is formed. Thus, the integrated circuit and the antenna can, in effect, directly contact each other, eliminating the need for a conventional die attach process and/or a strap-to-antenna attach process by which the integrated circuit (on a strap) is attached to the antenna (on a separate substrate).

By reducing the number of relatively expensive and/or low throughput attachment steps, as well as reducing the cost of fabricating the active electronics, a low cost wireless device may be produced by directly printing or otherwise forming an antenna on the integrated circuit and/or on the substrate. As a result, the present invention provides a relatively low-cost process for producing a wireless device, such as an RFID (or EAS) tag, comprising an integrated circuit and an antenna. These and other advantages of the present invention will become readily apparent from the detailed description of various embodiments below.

DETAILED DESCRIPTION

Figure 1A:
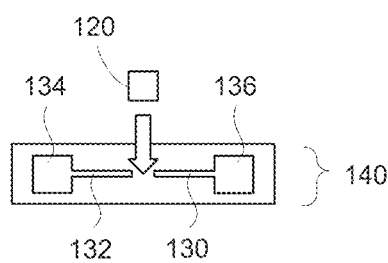
FIGS. 1A-1B show steps in a conventional process for manufacturing RFID tags involving attachment of a conventional semiconductor die to an antenna using a strap.
Figure 1B:
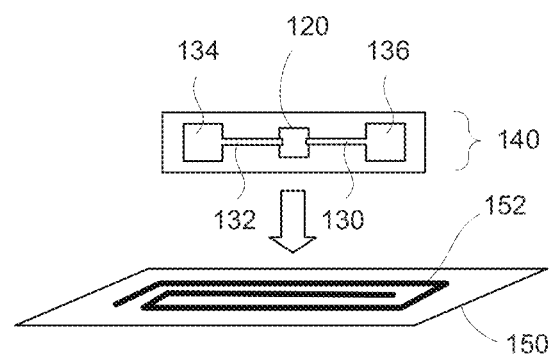
Figure 2A:
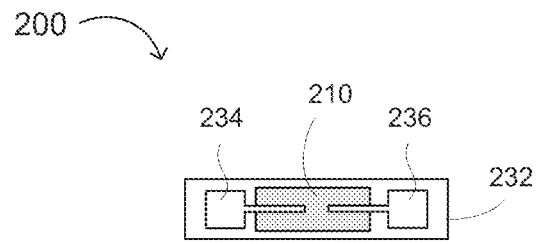
FIGS. 2A-2B show key steps in a related process for manufacturing a RFID tag/device involving attachment of a first carrier or substrate with printed integrated circuitry thereon to a second carrier or substrate containing an antenna thereon.
Figure 2B:
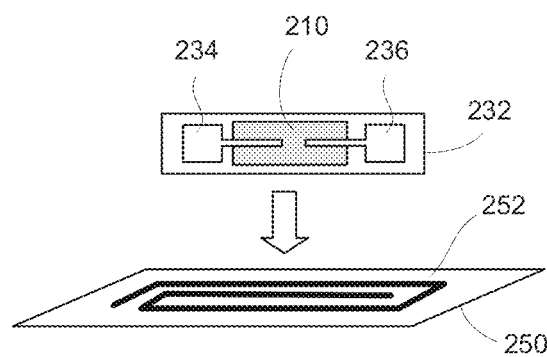

Reference will now be made in detail to certain embodiments of the invention, examples of which are illustrated in the accompanying drawings. While the invention will be described in conjunction with the disclosed embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings. Also, for convenience and simplicity, the terms "EAS", "RF," "RFID," and "identification" may be used interchangeably with respect to intended uses and/or functions of a device and/or tag. Also, the terms "integrated circuit," "integrated circuitry," "PIC," and "printed integrated circuitry" refer to a unitary structure comprising a plurality of electrically active devices formed from a plurality of conductor, semiconductor and insulator thin films, but generally does not include discrete, mechanically attached components (such as die, wire bonds and leads, the carrier, or an antenna and/or inductor component), or materials having primarily an adhesive function. The term "antenna" may be used in a general context to refer to an antenna, an inductor, or an antenna and inductor. Further, the terms "strap", "carrier," and/or "substrate" refer to a structure that may be used as a support for additional structures, including printed integrated circuitry and/or an antenna and/or inductor. In addition, the terms "item," "object," and "article" are used interchangeably, and wherever one such term is used, it also encompasses the other terms. In the present disclosure, a "major surface" of a structure or feature is a surface defined at least in part by the largest axis of the structure or feature (e.g., if the structure is round and has a radius greater than its thickness, the radial surface[s] is/are the major surface of the structure, and if the structure has three dimensions defined by a length, a width and a height or thickness, the major surface [s] of the structure may be the surface[s] defined by the two largest dimensions), and if the structure is substantially rectangular on all sides, the major surface is defined by the two largest axes.

Exemplary Method(s) for Making an Exemplary Wireless Device

In one aspect, the present invention concerns a method for making a wireless device, comprising the steps of (1) forming an integrated circuit on a first substrate; and (2) printing at least part of an antenna or antenna precursor layer on the integrated circuit and/or the first substrate, the antenna being in electrical communication with the integrated circuit. The present method provides a cost-effective method for manufacturing sensors, interactive displays, and EAS and identification (e.g., HF, VHF, UHF, and RFID) devices.

Figure 3A:
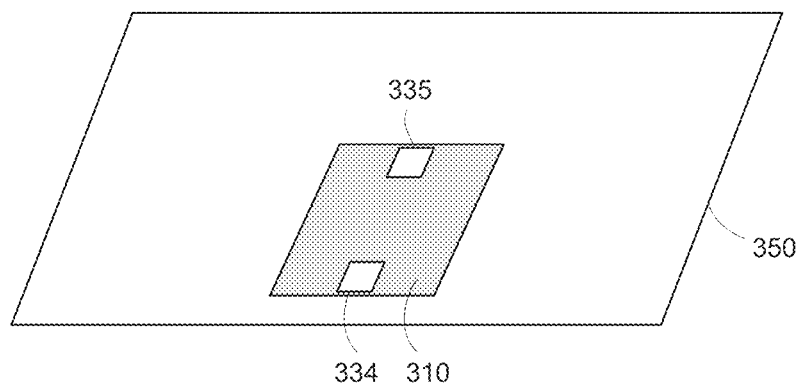
FIGS. 3A-3B show front and back views of an exemplary wireless device having printed integrated circuit and an antenna or antenna precursor layer on a single substrate.

A first exemplary method for manufacturing the present RFID device is described below with reference to FIGS. 3A-3B. FIG. 3A shows a substrate 350 and a printed integrated circuit 310 thereon. Generally, the integrated circuit 310 comprises a printed integrated circuit, formed on a first major surface of the substrate 350.

In various embodiments, the substrate 350 comprises a conductive (electrically active) or non-conductive (electrically inactive) substrate, as depicted in FIG. 3A. The phrase "electrically active" refers to the properties of the substrate, and not necessarily the interaction between the substrate and the printed integrated circuit. Additionally, the substrate 350 may be flexible, inflexible, or rigid.

The substrate 350 generally has a size that can be cost-effectively processed using conventional thin film processes and/or emerging or state-of-the-art printing processes, to produce low-cost wireless circuits. Integrated circuit 310 can be formed on substrates such as plastic (e.g., polyethylene terephthalate [PET]), paper, glass, ceramic, metal or any other insulating or conducting substrate, including polyimide, glass/polymer laminates, high-temperature polymers, and metal foils, all of which may further include one or more barrier coats.

In various embodiments, it may be advantageous to use an anodized or "clean" (non-anodized) Al, Al/Cu, Cu, stainless steel or similar metal foil as the substrate. Such materials may serve as an interconnect, an electrode (or plate, and when anodized, a dielectric) for one or more storage or IC resonance capacitors, an inductor, an electrode for a diode, MOS device or FET, or as an element of a write once read many (WORM), one-time programmable (OTP), deactivation or other memory storage element. Examples of such substrates can be found in U.S. Pat. Nos. 7,152,804 and 7,286,053, the relevant portions of each of which are incorporated herein by reference.

It also may be advantageous to use as the substrate for the printed integrated circuitry a flexible material that may be adapted to withstand relatively high-temperature processing (e.g., a temperature of 300° C., 350° C., 400° C., 450° C. or more, up to a temperature of 500° C., 600° C., or 1000° C.), without significant deterioration or decrease in its mechanical and/or electrical properties. For example, the substrate may comprise a thin (10-200 micron) glass sheet or slip, a glass/polymer laminate, a high temperature polymer (e.g., a polyimide, a polyethersulfone, polyethylene naphthalate [PEN], polyether ether ketone [PEEK], etc.), or a metal foil such as aluminum, stainless steel or copper. Exemplary thicknesses depend on the material used, but in general, range from about 10 μm to about 200 μm (e.g., from about 50 μm to about 100 μm or any other range of values therein).

In various embodiments, the substrate 350 may have one or more insulating, planarizing, buffering, or other materials coated or otherwise deposited thereon. The substrate is conventionally cleaned and optionally coated with a barrier material (such as silicon dioxide, aluminum oxide, or a conductive barrier such as titanium nitride) before further processing. The coating step may comprise oxidation and/or anodization of a surface material of the substrate (e.g., a metal foil); deposition of a spin-on or fluid barrier composition; sputtering, CVD, or spray coating a barrier material onto the substrate; or a combination of any of these processes (see, e.g., U.S. patent application Ser. No. 11/243,460, filed on Oct. 3, 2005, the relevant portions of which are incorporated herein by reference).

Conventional thin film processes, as well as conventional and/or state-of-the-art printing processes, can be used to produce the printed integrated circuitry (e.g., 310 in FIG. 3A). Nearly any layer of material in the integrated circuitry 310 can be made by either blanket deposition or selective deposition (e.g., printing), but generally, at least one layer of material in the integrated circuitry 310 is printed. In further embodiments, at least two or three layers of material in the integrated circuitry 310 are printed. Such printed materials can include semiconductor islands, gates or interconnects; dielectric layers such as gate dielectrics, dopant-containing dielectrics, interlayer dielectrics, and passivation; conductive metal compounds for structures such as source/drain contacts, (local) interconnects, and seed layers for metal interconnects; and metals for structures such as interconnects, seed layers for interconnects, pads and (ohmic) contacts.

Blanket deposition may comprise, e.g., evaporation, physical vapor deposition, sputtering, or chemical vapor deposition (CVD and variations thereof, such as low pressure CVD [LPCVD], plasma-enhanced chemical vapor deposition [PECVD]). Selective deposition (e.g., printing) may comprise ink jet printing, screen printing, gravure printing, offset printing, extrusion coating, combinations thereof, and/or other techniques, in a predetermined pattern of any element or layer. For reference, see U.S. Pat. Nos. 7,152,804 and 7,286,053 and/or U.S. patent application Ser. Nos. 11/455,976, 11/455,363, 11/246,014, 11/893,054, 11/452,108, 11/888,949, 11/888,942, 11/818,078, 11/867,587, 11/842,884, 12/114,741, 12/131,002, and 12/243,880 filed on Jun. 19, 2006, Jun. 16, 2006, Jun. 5, 2005, Aug. 13, 2007, Jun. 12, 2006, Aug. 3, 2007, Aug. 3, 2007, Jun. 12, 2007, Oct. 4, 2007, Aug. 21, 2007, May 2, 2008, May 30, 2008, and Oct. 1, 2008, the relevant portions of each of which are incorporated herein by reference.

In one embodiment, the integrated circuit comprises a printed integrated circuit (PIC). Forming the printed integrated circuit 310 on the substrate 350 generally comprises printing at least one layer of the printed integrated circuit 310 in a first pattern on the substrate. Printing the layer(s) of the printed integrated circuit 310 may comprise printing an ink that includes one or more semiconductor (e.g., silicon) precursor(s), metal precursors, or dielectric precursors in a solvent in which the semiconductor, metal, or dielectric precursor(s) are soluble. For example, the semiconductor precursor may comprise silicon nanoparticles and/or an oligo- and/or polysilane, which may be doped or undoped. For further details, see U.S. patent application Ser. Nos. 10/949,013, 11/246,014, 11/867,587 filed on Sep. 24, 2004, Jun. 5, 2005, and Oct. 4, 2007, the relevant portions of each of which are incorporated herein by reference.

In various embodiments, forming the printed integrated circuit 310 on the substrate 350 further comprises printing a second layer of a second material in a second pattern on or above the first pattern. The second material may comprise a dielectric precursor, such as a molecular, organometallic, polymeric and/or nanoparticle in a solvent or solvent mixture in which dielectric precursor is soluble. In some embodiments, the dielectric precursor is a source of silica, silicon nitride, silicon oxynitride, aluminate, titanate, titanosilicate, zirconia, hafnia, or ceria. In other embodiments, the dielectric precursor is an organic polymer or precursor thereof (e.g., a [meth]acrylate polymer). The solvent for the dielectric precursor can be a solvent mixture that comprises a high volatility solvent in an amount of at least 10 wt % of the solvent mixture, and a low volatility solvent in an amount of at least 10 wt % of the solvent mixture. High volatility solvents include those that are liquid at ambient temperatures (e.g., 15-30° C.), but which have a vapor pressure at 25° C. of at least 1 torr, and preferably, of not more than 200 torr, and/or that have a boiling point at 1 atm pressure of less than 150° C. Low volatility solvents include those that are liquid at ambient temperatures, but which have which have a vapor pressure at 25° C. of not more than 10 torr, and preferably, of at least 0.01 torr, and/or that have a boiling point at 1 atm pressure of more than 150° C. The second material may further comprise a dopant precursor containing a dopant element selected from the group consisting of boron, phosphorous, arsenic, and antimony.

In a further embodiment, forming the printed integrated circuitry on the substrate further comprises printing a third layer of a third material in a third pattern on or above the first and/or second pattern(s). The third material may comprise a metal precursor, in which the metal precursor comprises one or more Group 4, 5, 6, 7, 8, 9, 10, 11, or 12 metal salts, complexes, clusters and/or nanoparticles in a third solvent or solvent mixture adapted to facilitate coating and/or printing of the metal precursor. In certain embodiments, the metal precursor comprises a metal salt, compound and/or complex having one or more ligands bound thereto that form gaseous or volatile byproducts upon reduction of the metal salt, compound and/or complex to an elemental metal and/or alloy thereof. The third material may further comprise one or more additives (e.g., one or more reducing agents) that can also form gaseous or volatile byproducts upon reduction of the metal salt, compound and/or complex to an elemental metal and/or alloy. Such metal formulations enable the printing of a pure metal film using metal precursor(s) and reducing agent(s) that generally do not leave substantially adverse levels of impurities and/or residues in the film. For additional details, see U.S. patent application Ser. No. 12/131,002, filed May 30, 2008, the relevant portions of which are incorporated herein by reference.

For each printed layer of the integrated circuit 310, the printed precursor ink(s) is generally dried and cured. The lengths of time and the temperatures at which the ink is dried and the dried precursor(s) are cured depend upon the particular ink formulation and the particular precursor(s), but in general, the ink is dried at a temperature and for a length of time sufficient to remove substantially all of the solvent from the printed ink, and the dried precursor(s) are cured at a temperature and for a length of time sufficient to convert the precursor(s) to the material of the final patterned film (e.g., a semiconductor, dielectric or metal).

In some embodiments, the printed integrated circuit 310 contains CMOS integrated circuitry, fabricated using printing and ink technologies on the aforementioned substrate 350 and/or using conventional (e.g., thin-film) deposition and patterning equipment. The printed integrated circuit generally provides the functionality for one or more wireless applications such as electronic article surveillance (EAS) and/or HF, VHF, UHF, or radio frequency identification (RFID) tags in a range of common frequencies (e.g. 8 MHz, 13 MHz, 900 MHz, 2.7 GHz, etc.), display applications such as display drivers and/or TFT backplanes, integrated memory such as printed EEPROM, one-time programmable (OTP) memory and/or read-only memory (ROM), sensor applications such as biosensors, hazard sensors, and other sensors, and combinations thereof.

In various embodiments, each printing operation independently comprises screen printing, flexographic printing, gravure printing or inkjet printing. Various printed integrated circuits and methods of forming printed integrated circuits are described in U.S. patent application Ser. No. 11/452,108, filed Jul. 12, 2006, U.S. patent application Ser. No. 11/888, 949, filed Aug. 3, 2007, U.S. patent application Ser. No. 11/888,942, filed Aug. 3, 2007, U.S. patent application Ser. No. 11/809,737, filed May 31, 2007, U.S. patent application Ser. No. 11/842,884, filed Aug. 21, 2007, U.S. patent application Ser. No. 11/084,448, filed Mar. 18, 2005, U.S. patent application Ser. No. 11/203,563, filed Aug. 11, 2005, and U.S. Pat. Nos. 7,152,804 and 7,286,053, the relevant portions of each of which are incorporated herein by reference.

In general, an uppermost layer of the integrated circuit 310 includes pads 334 and 335, configured to electrically connect the functional elements or blocks of the integrated circuit 310 to a subsequently formed antenna. The pads 334 and 335 generally comprise a metal, and may be formed by one of the printing techniques described above. Thus, for example, printing the conductive pads 334, 335 generally comprises printing a first metal precursor ink in a pattern on the underlying printed integrated circuit 310. The pads 334 and 335 may further include an interconnect portion to electrically connect a pad to an opening in an underlying dielectric layer to an underlying electrically functional layer. In many wireless devices, the pads 334 and 335 are each electrically connected (by an interconnect portion of the pad; not shown in FIG. 3A) to a rectifier circuit, one or more capacitors, and demodulator/modulator circuits. Thus, the pads may be located relatively far apart on the integrated circuit 310, but the circuit(s) to which the pads are connected may be located in a relatively small part of the integrated circuit 310.

In some embodiments of the present invention, an additional insulating layer (e.g., one or more layers of passivation; not shown) may be printed onto printed integrated circuit 310 before printing the antenna. Generally, the insulating layer has openings exposing pads 334 and 335 (e.g., for electrical contact to circuitry within printed integrated circuit 310). To facilitate facile electrical connections, the pads 334, 335 may have conductive/metal bumps thereon.

Figure 3B:
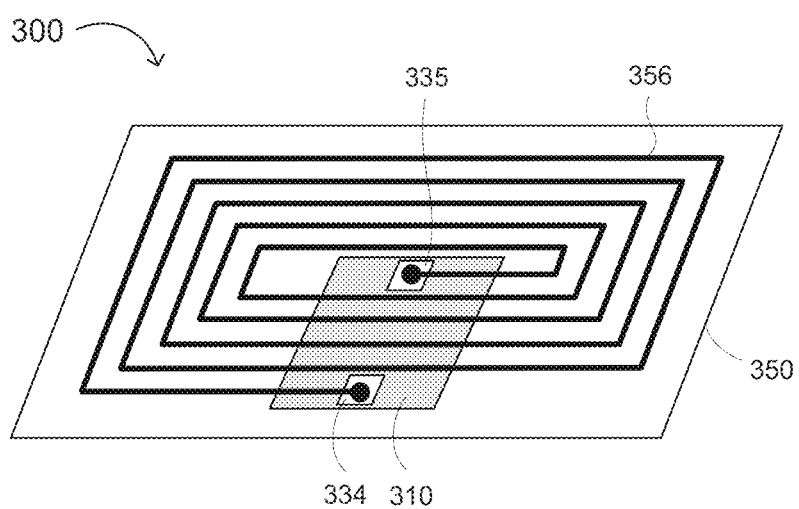

As shown in FIG. 3B, an antenna 356 may be printed on top of the printed integrated circuit 310 and substrate 350 in a predetermined pattern. In some embodiments of the present invention, printing the antenna 356 comprises printing an antenna precursor ink on the printed integrated circuit 310, then drying printed ink and curing the dried antenna precursor(s). Thus, printing the antenna 356 may comprise printing a metal precursor ink on the printed integrated circuit 310 and substrate 350, drying the ink (e.g., to remove the solvent) and annealing the metal precursor to form a conductive metal antenna 356. In one embodiment, first and second ends of the antenna 356 are printed onto first and second conductive surfaces (e.g., pads 334 and 335) configured to electrically communicate with the printed integrated circuit 310. In such an embodiment, the integrated circuit 310 generally comprises an uppermost passivation layer having first and second openings therein, exposing the first and second conductive surfaces (e.g., pads 334 and 335).

As shown in FIG. 3B, printing the antenna 356 on the printed integrated circuit 310 and/or the substrate 350 may comprise printing part of the antenna 356 on the printed integrated circuit 310 and part of the antenna 356 on the substrate 350. The antenna 356 can be directly screen printed, flexographically printed, gravure printed or inkjet printed onto the printed integrated circuit 310 and substrate 350. In the embodiment shown in FIG. 3B, the large size of the printed integrated circuit 310 enables a high throughput and low cost process to "attach" (e.g., print) the antenna 356 onto the integrated circuit 310 and substrate 350.

While the integrated circuit 310 generally has an area much smaller than that of the substrate 350, in an alternative embodiment, the integrated circuit 310 can have sufficient functionality, size and/or complexity to consume an area similar to that of the antenna 356. In such as embodiment, the antenna 356 can be printed entirely onto a passivation layer over the integrated circuit (not shown), except for the ends of the antenna 356 in contact with the pads 334 and 335. As with other embodiments, the ends of the antenna 356 are electrically connected to pads 334 and 336, exposed through openings in the passivation layer on the uppermost surface of the integrated circuit 310. In such an embodiment, the substrate 350 may have a major surface with dimensions slightly larger than those of the integrated circuit 310 (which, in turn, includes an uppermost passivation layer having a major surface with dimensions slightly larger than those of the antenna 356).

The above direct antenna printing process is also applicable to integrated circuits 310 fabricated on a substrate 350 using conventional thin film transistor (TFT) technology, such as is used in the display industry, and may be applicable to combine single crystal silicon, silicon, or chips. However, the tolerances for alignment between the printed antenna and pads on a single crystal silicon chip are more demanding. Typical pad sizes in conventional RFID chips are from ~50 to ~120 μm square with inter-pad spacings of from ~100 to a few hundred microns. In a PIC, the size of the pads 334, 335 are generally larger, with considerably greater spacing between the pads.

Figure 4A:
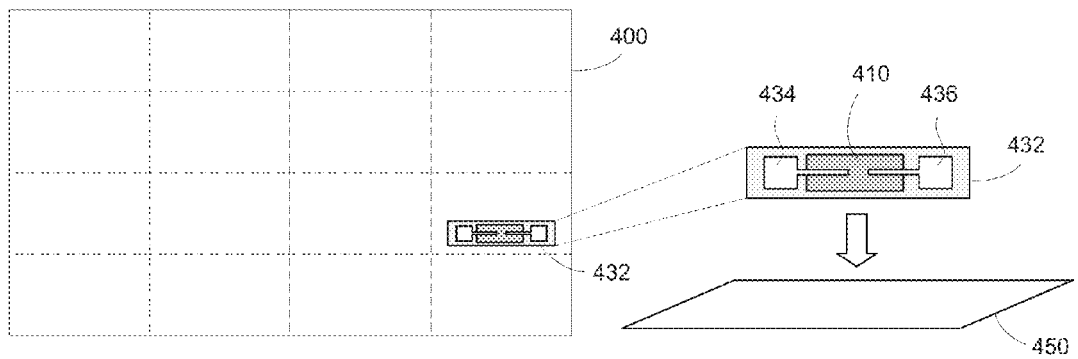
FIGS. 4A-4D show key steps in an exemplary process for manufacturing a wireless tag/device involving printing an integrated circuit on a first substrate and printing an antenna on the printed integrated circuit and/or a second substrate.

Referring to FIG. 4A, in an alternative embodiment, an integrated circuit 410 may be fabricated on a substrate 432 (e.g., a metallic sheet or a plastic or glass strap/interposer). The substrate 432 may be a unit of a sheet or roll comprising a plurality of such substrates (e.g., straps, interposers or slips) 432 attached to each other at or along the edges. The printed integrated circuit 410 may contain integrated circuitry (e.g., CMOS integrated circuitry) on the substrate fabricated using printing and ink technologies and/or using conventional (e.g., thin-film) deposition and patterning equipment as described herein. The printed integrated circuit 410 may provide functionality for wireless applications as described herein, and may include an additional insulating layer and/or passivation layer (not shown) thereon, having first and second openings therein exposing first and second conductive surfaces configured to enable electrical communication with the integrated circuit 410.

In the embodiment shown in FIG. 4A, conductive pads 434, 436 are printed on the first substrate 432, with interconnect portions 440, 442 printed simultaneously on the printed integrated circuit 410. Alternatively, the pads may be formed from the substrate (see, e.g., U.S. patent application Ser. No. 12/249,707, filed Oct. 10, 2008, the relevant portions of which are incorporated herein by reference). The pads 434, 436 and interconnect portions 440, 442 may be printed by any of the techniques described herein or formed conventionally. Via interconnect portions 440 and 442, the conductive pads 434, 436 are in contact with an externally exposed conductive material of the printed integrated circuit 410. Printing the conductive pads 434, 436 on the substrate 432 (and optionally in part on the printed integrated circuit 410) may comprise printing a metal precursor ink in a pattern. Subsequently, the metal precursor ink is dried and annealed. The conductive pads 434, 436 are thus in electrical contact with an externally exposed conductive material of the printed integrated circuit 410.

When substrate 432 is part of a sheet or roll of such substrates, the sheet or roll is separated or cut into small straps (e.g., 432) of a size optimized for handling by a strap attachment machine (which may be roll-to-roll or pick-and-place), and/or to match requirements of a specific application. Pads 434 and 436 may be printed on the substrate 432 in electrical communication with the printed integrated circuit 410, generally before separation from the substrate material. Alternatively, pads 434 and 436 may be printed after separation from the substrate material.

Figure 4B:
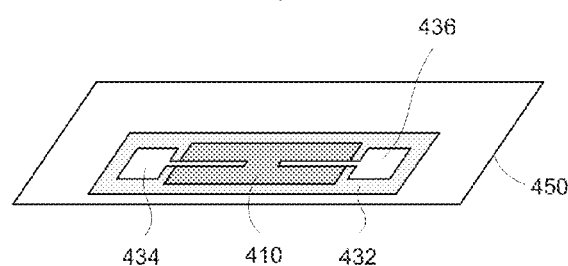

Subsequently, as shown in FIG. 4B, the strap 432, including printed integrated circuit 410, is then attached to the substrate 450 using a low-resolution roll-to-roll or pick-and-place process and a low cost, non-conductive adhesive. Using the pick-and-place process, strap 432 can be placed on the substrate 450 one-by-one in a serial fashion or a plurality of straps may be attached to the substrate 450 simultaneously. For example, pick-and-place equipment can pick up an array of straps 432 and simultaneously place them in corresponding locations on the substrate 450, thus increasing the number of straps 432 placed on the substrate 450 over a given period of time. Furthermore, the relatively large size of the strap 432 improves the ease of handling by such pick-and-place equipment. Alternatively, the strap 432 can be placed on substrate 450 using standard die sorting and die pick and place machines (e.g., a die sorter and a die pick and place apparatus commercially available from Muehlbauer, Germany). Die sorters can also take diced integrated circuits from a wafer (or, in the present case, printed integrated circuits on a substrate) and place them onto a web roll for a roll-to-roll attach process (the substrates 450 being in the form of a roll in such a process). In the exemplary embodiment of FIG. 4B, attaching the substrate 432 to the substrate 450 utilizes a non-conductive glue that is applied to either the underside of the substrate 432 (i.e., the surface away from the pads 434, 436), the upper surface of the substrate 450 (i.e., facing the underside of strap 432, or both.

The substrate 450 generally has a greater area than the strap 432. In various embodiments, the area of the substrate 450 is at least two times, three times, four times, etc., that of the strap 432. In some embodiments, the substrate 450 may be non-conductive or electrically inactive, as described herein. After placing the strap 432 on the substrate 450, pressure and/or heat may be subsequently applied to the printed integrated circuit 410 and/or the strap 432. This attachment process (which may comprise applying pressure and/or heat to the opposed major surfaces of strap 432 and substrate 450) may secure the strap 432 relatively reliably to the substrate 450.

Figure 4C:
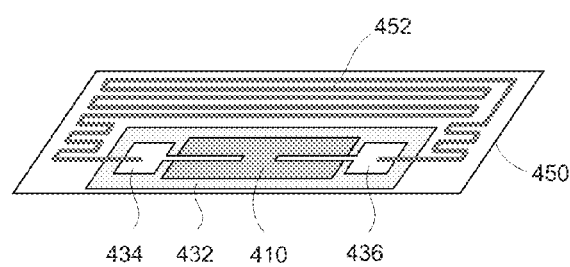

Referring to FIG. 4C, an antenna seed layer 452 may be printed on the substrate 450 such that first and second ends of the antenna seed layer 452 are in contact with pads 434 and 436. Printing the antenna seed layer 452 may comprise printing an ink comprising a metal or other conductive material precursor on the substrate 450 and integrated circuit 410, then drying the ink and curing or annealing the precursor. In one embodiment, the metal precursor-containing ink includes a palladium salt or compound (e.g., $PdCl_2$; see, for example, U.S. patent application Ser. No. 12/131,002, filed May 30, 2008, the relevant portions of which are incorporated herein by reference). Alternatively, the antenna seed layer 452 may comprise a metal other than palladium, for example from a commercially available ink. The resulting printed seed layer is useful for subsequent electroplating and/or electroless plating of metals on the printed metal (e.g., palladium) layer. This embodiment may be particularly advantageous for forming an antenna on a non-conductive substrate.

As a result, a seed layer is formed by printing the seed layer 452 in the pattern of the antenna, in part on the pads 434 and 436, in part on the strap 432, and in part on the substrate 450, as shown in FIG. 4C. Thus, the "substrate" on which the seed layer is printed may comprise both the strap 432 and the substrate 450. The pattern of the seed layer 452 has first and second ends on first and second conductive surfaces (e.g., pads 434 and 436). Conductive pads 434, 436 generally face upwards when the seed layer 452 is printed thereon.

Figure 4D:
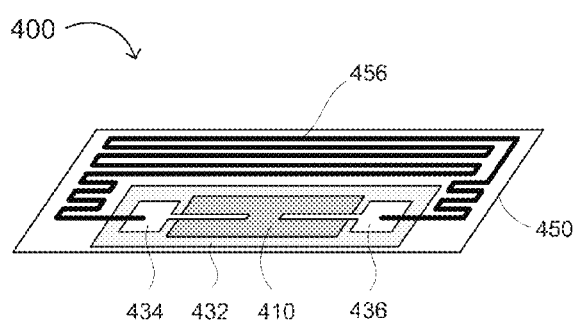

As shown in FIG. 4D, the antenna 456 is formed by selectively depositing a bulk conductor onto the seed layer 452. Such selective deposition may comprise, e.g., electroplating or electroless plating the bulk conductor from a solution of a salt or compound of the bulk conductor in a plating bath. The bulk conductor may be selected from the group consisting of Al, Co, Ni, Cu, Ag, Au, Pd, and Pt. In one embodiment, electroless plating comprises immersing the substrate with the printed metal film 452 thereon into an electroless plating solution of an interconnect metal (e.g., the bulk conductor) to form a conductive layer on the printed metal film, as described in U.S. patent application Ser. No. 12/131,002, filed May 30, 2008, the relevant portions of which are incorporated herein by reference.

After plating the bulk conductor 456 onto the seed layer 452, an annealing process is performed. The annealing time and temperature depends on the particular bulk conductor used, but are generally sufficient to densify the bulk conductor, improve its conductivity, form an ohmic contact between the seed layer 452 and the pads 434 and 436, and/or physically secure the antenna 456 relatively reliably to the substrates 432 and 450. Alternatively, the antenna 456 may be directly printed on the integrated circuit 410 or the substrate 432, and subsequently, the thickness of the conductive antenna traces can be increased by plating. The antenna 456 may be formed on one or both major surfaces of the substrate 450.

The present process can be optimized to have a very high throughput and a relatively low capital expenditure. Commercially available low cost printing and/or plating tools can be used. The large size of the printed integrated circuit allows use of printing processes using low cost equipment such as printing tools having relatively broad tolerances and low resolution, typically in the order of microns, to make the printed integrated circuit 410 and print the antenna 456 of FIG. 4D. As a result, lower precision printing and placement equipment can be employed in the manufacturing process, reducing capital and manufacturing costs, while increasing yield.

Figure 5A:
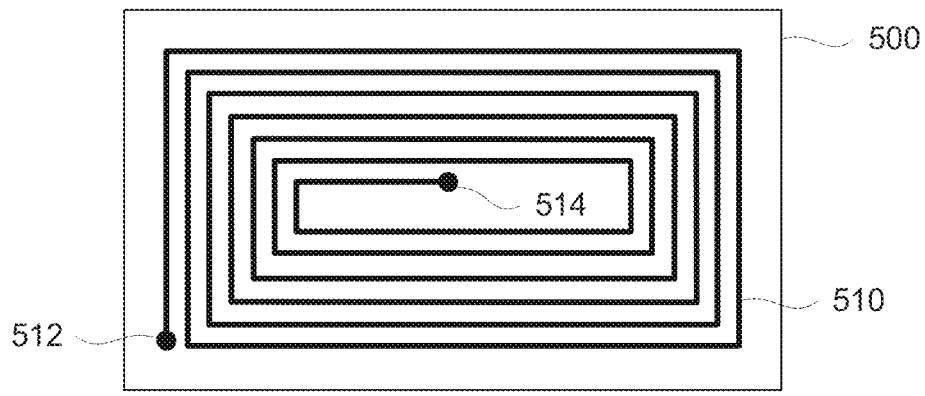
FIGS. 5A-5C show key steps in an exemplary process for manufacturing a wireless tag/device involving printing an antenna on a substrate, then forming a printed integrated over the antenna.
Figure 5B:
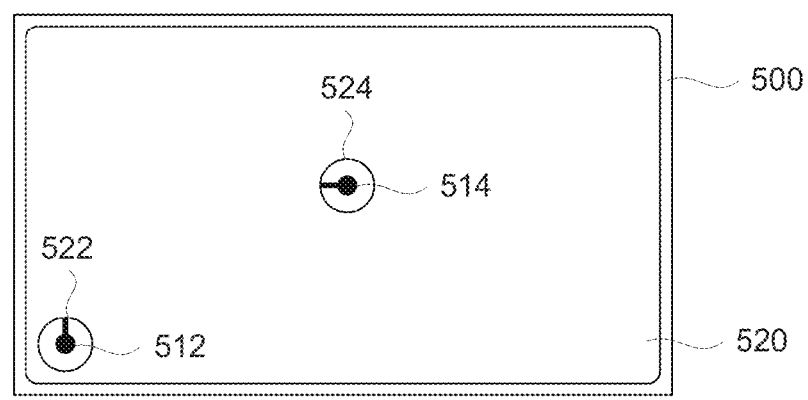
Figure 5C:
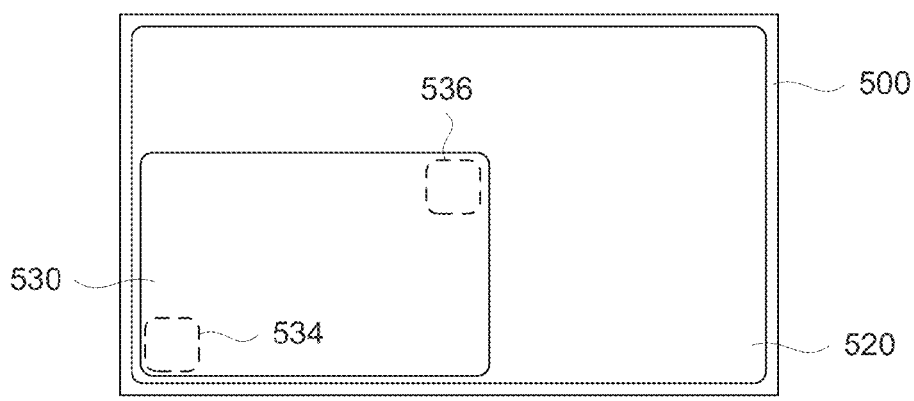

FIGS. 5A-5C show another alternative arrangement for the present integrated circuit and printed antenna. Referring to FIG. 5A, an antenna 510 is printed directly onto a substrate 500. Substrate 500 can comprise an electrically active or electrically inactive substrate that can be coated with one or more layers, as described herein. Antenna 510 can comprise a single-layer antenna (such as antenna 356 of FIG. 3B) or a bulk conductor plated onto a seed layer (such as antenna 452/456 of FIGS. 4C-4D) as described herein, and be formed by the same or similar methods. Referring to FIG. 5A, antenna 510 (which has a spiral or concentric pattern, similar to antenna 356 of FIG. 3B, rather than a serpentine pattern like antenna 452/456 of FIGS. 4C-4D) has first and second ends 512 and 514.

In FIG. 5B, a dielectric layer 520 is printed or otherwise deposited onto the substrate 500, over the antenna 510. When the dielectric layer 520 is blanket deposited, openings 522 and 524 can be formed therein by etching (e.g., after conventional photolithographic masking, by placement of microdrops [e.g., drops having a maximum volume of about 0.1 µl] of liquid etchant, etc.). When the dielectric layer 520 is printed, openings 522 and 524 can be formed as part of the pattern of the dielectric precursor ink, or the dielectric precursor ink can be printed in a pattern covering the entire antenna 510 (including ends 512 and 514), and the openings can be formed by etching as described herein. The dielectric layer 520 may comprise any of the dielectric materials described herein, and be formed by one or more methods as described herein for other dielectric layers.

FIG. 5C shows a printed integrated circuit 530, formed on the dielectric layer 520 by the various processes described herein. A first layer of the printed integrated circuit 530 comprises pads 534 and 536, which may comprise the same materials and be formed according to the same methods as other pads described herein. The printed integrated circuit 530 may further comprise conductive interconnects (not shown) between pads 534 and 536 and one or more functional blocks in the integrated circuit 530, such as a rectifier, a capacitor, and/or demodulator/modulator blocks. The conductive interconnects may comprise the same materials and be formed according to the same methods as described elsewhere herein. In the case where demodulator and modulator blocks are present, one pad is electrically connected to the demodulator block, and the other pad is electrically connected to the modulator block.

Exemplary Tags and/or Devices

Another aspect of the present invention relates to an identification (e.g., RFID) or other wireless device, comprising (a) an integrated circuit on a first substrate; and (b) an antenna, directly on the first substrate and/or the integrated circuit, in electrical communication with the integrated circuit. The present wireless device may also include sensors (the signal modulation activities of which may change as a result of certain external changes in the environment [e.g., temperature, conductivity of the structure or surface to which the sensor is attached, etc.]) and active RF or wireless circuits and/or devices (e.g., tags with a battery on board). The present RF device may include an RF front end (or subset of an RF front end and logic circuit) fully capable of operating in accordance with modern wireless or RFID standards. The present device includes identification tags including integrated circuitry configured to operate in a certain frequency range. For example, functional ID tags in the RF, HF, VHF, and UHF regimes are possible, and are described in further detail in U.S. patent application Ser. Nos. 11/452,108 and 12/467,121, filed Jun. 12, 2006 and May 15, 2009, respectively, the relevant portions of each of which are incorporated herein by reference.

Figure 6:
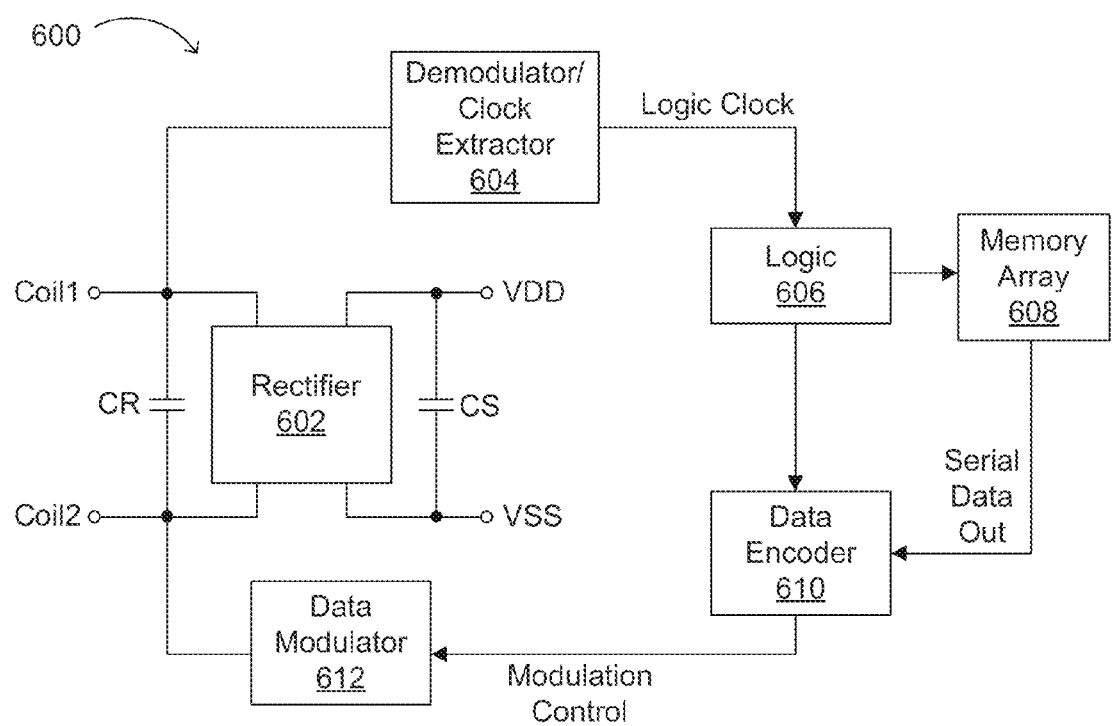
FIG. 6 shows exemplary function blocks for an exemplary RFID tag.

According to certain embodiments, and as shown in FIG. 6, the identification tag or device 600 (e.g., a HF, UHF, VHF, RF, RFID, or multi-mode EAS/RFID tag, etc.) comprises an antenna (e.g., Coil1, Coil2), an RF or other wireless circuit coupled to the antenna configured to receive a wireless power signal and to modulate an absorption of the wireless power signal to provide a response (e.g., demodulator and/or clock extractor 604, data modulator 612), one or more data storage circuits or memory circuits 608 configured to store identification data and/or supplemental (response) data, and a response circuit configured to produce the response containing the identification data and the supplemental data (e.g., logic 606 and data encoder 610). Designs for wireless identification tags (e.g., HF, UHF, and/or RFID tags) are described U.S. patent application Ser. Nos. 11/452,108, 11/544,366, and 11/870,775, respectively filed Jun. 13, 2006, Oct. 6, 2006, Aug. 21, 2007, and Oct. 11, 2007, the relevant portions of which are incorporated herein by reference.

Communication from tag to reader generally occurs through impedance modulation. In the HF range and lower, the tag is usually in the near field, inductive-coupling range, significantly less than the free space wavelength of the RF carrier. In this case, there is a direct inductive coupling between the tag, which typically has a resonant inductor-capacitor (LC) loop (e.g., including the antenna connected at Coil1/Coil2 and a capacitor CR) tuned at or near the carrier frequency, and the reader, through the primary and secondary coils of a simple inductor-based AC transformer. Modulation of the resonance characteristics of the LC loop in the tag, typically through a variable resistive load (which can be provided by a transistor), results in a detectable impedance change in the reader front end circuit. The tag circuitry serially reads out data via this modulation signal to the reader.

At UHF frequencies, the reader to tag distance is generally longer, and the carrier wavelength is shorter. Due to this, the RF link between the two falls in the range of electromagnetic wave propagation physics, as is typically the case in radar, AM/FM radio or cellular phone technology. In this case, the tag links to the reader via a reflected backscatter signal. By modulating the impedance of the tag's antenna(e), the amount of power or the phase or frequency of the signal reflected back to the reader can be changed, and a time-varying signal can be encoded with this form of modulation. This modulation can be performed resistively, as with a transistor, or through the use of varactors that modulate the imaginary part of the tag antenna's impedance.

Various devices in accordance with embodiments of the invention are shown in FIGS. 3B, 4D and 5C. The device 300 of FIG. 3B comprises a substrate 350, an integrated circuit 310 thereon, and a printed antenna and/or inductor 356 on the substrate 350 and the printed integrated circuit 310, as described herein. The device 400 of FIG. 4D comprises an integrated circuit 410 on a first substrate 432, pads 434 and 436 on the first substrate 432 that are electrically connected to the integrated circuit 410, a second substrate 450 on which the first substrate 432 is attached, and a printed antenna and/or inductor 456 on the first and second substrates 432 and 450 with ends electrically connected to the pads 434 and 436, as described herein. The device 300 of FIG. 5C comprises a substrate 500, a printed antenna and/or inductor 510 on the substrate 500, a dielectric layer 520 covering the antenna 510, and a printed integrated circuit 530 on the dielectric layer 520, as described herein.

In various embodiments, the integrated circuit (e.g., 310, 410 or 530) may comprise complementary metal-oxide-semiconductor CMOS circuitry and/or devices manufactured by printing one or more (preferably a plurality) of patterned layers on or over the substrate (e.g., 350, 450 or 500). The integrated circuit provides the functionality of the device 300 for a variety of applications as described herein.

Generally, the integrated circuit comprises one or more semiconductor layers (e.g., a transistor channel layer, a source/drain terminal layer, and/or one or more intrinsic and/or lightly- or heavily-doped diode layers); a gate insulator layer on or over at least one of the semiconductor layers; a gate metal layer on the gate insulator layer; one or more capacitor electrodes (each of which is generally capacitively coupled to a complementary capacitor electrode, which may also be part of the integrated circuitry or which may be integrated with or part of the substrate or antenna layer); a plurality of metal conductors in electrical communication with the gate metal layer, the source and drain terminals, an uppermost and/or lowermost diode layer and/or an uppermost and/or lowermost capacitor electrode; and one or more dielectric layers between various metal conductors and/or semiconductor layer(s). The integrated circuit generally comprises at least one printed layer. The integrated circuit may further comprise one or more resistors, which may comprise a metal and/or lightly or heavily doped polysilicon. Exemplary semiconductor, dielectric and metal layers for such integrated circuit elements are described herein, and materials and methods for forming such layers and circuit elements are described in greater detail in U.S. patent application Ser. Nos. 11/084,448, 11/203,563, 11/243,460, 11/452,108, 11/888,949, 11/888,942, 11/818,078, and 11/842,884 respectively filed on Mar. 18, 2005, Aug. 11, 2005, Oct. 3, 2005, Jun. 12, 2006, Aug. 3, 2007, Aug. 3, 2007, Jun. 12, 2007, and Aug. 21, 2007, the relevant portions of each of which are incorporated herein by reference.

In some embodiments (e.g., FIG. 4D), a plurality of pads (e.g., 434/436) may be formed on the printed integrated circuit, in electrical communication with the printed integrated circuit. Each pad is generally also in electrical communication with an end of the antenna. In the embodiment of FIG. 4D, the device 400 may further comprise an adhesive layer (not shown) between the strap 432 containing the integrated circuit 410 and the substrate 450. The adhesive may comprise a non-conductive glue, generally applied to or dispersed onto the underside of strap 432 prior to placing the strap 432 onto the substrate 450. In one embodiment, the adhesive may be a B-staged non-conductive adhesive.

The antenna (e.g., 356, 456 or 510) may comprise one or more layers and/or coils. For example, the antenna may comprise a seed layer (e.g., 452 in FIG. 4C) and a bulk conductor thereon. Further, the antenna may be formed on one or both sides of the substrate (see, e.g., U.S. patent application Ser. No. 11/749,114, filed May 15, 2007, the relevant portions of which are incorporated herein by reference). Generally, the antenna comprises a metal. In one embodiment, the metal may comprise or consist essentially of aluminum, silver, gold, copper, palladium, titanium, chromium, molybdenum, tungsten, cobalt, nickel, platinum, zinc, iron, or a metal alloy thereof. Preferably, the antenna comprises silver or gold, which may be plated onto a palladium seed layer.

The substrate (e.g., 350, 432, 450 or 500) for the printed integrated circuit and/or the antenna may comprise any substrate capable of providing physical support for the integrated circuit during the formation thereof and during post-formation processing, as well as for the antenna and/or inductor component during the printing thereof. The substrate may be flexible, inflexible, or rigid. The substrate can be conductive (electrically active) or non-conductive (electrically inactive), as described herein.

Exemplary Methods of Use

The present invention further relates to a method of wirelessly communicating with the present wireless device. The method generally comprises (i) causing or inducing a current in the wireless device sufficient for the device to absorb, radiate or backscatter detectable electromagnetic radiation (preferably at a frequency that is an integer multiple or an integer divisor of an applied electromagnetic field), (ii) detecting the detectable electromagnetic radiation, and optionally, (iii) processing information conveyed by the detectable electromagnetic radiation. Generally, currents and voltages are induced in the present wireless device sufficient for the device to absorb, radiate or backscatter detectable electromagnetic radiation when the device is in a detection zone comprising an oscillating electromagnetic field. When the wireless device comprises an ID tag, the method may relate to detecting an item or object in a detection zone. In such an embodiment, the information conveyed by the detectable electromagnetic radiation may comprise identification information, product or item information, etc.

This oscillating electromagnetic field is produced or generated by conventional EAS and/or HF, VHF, UHF or RFID equipment and/or systems. Thus, the present method of use may further comprise attaching or affixing the present device to an object or article (e.g., an identification card, packaging for goods to be shipped, a vehicle sticker or card for automatic toll payment or parking privileges, etc.) to be detected, or otherwise including the present device in such an object, article or packaging therefor. Readers for the present device may include cell phones, personal digital assistants, and other wireless communication devices, including portable and/or handheld devices.

When the present device is an ID tag, it is generally designed to work with electronic identification and/or security systems that sense disturbances in radio frequency (RF) electromagnetic fields. Such electronic systems generally establish an electromagnetic field in a controlled area, defined by portals through which articles must pass in leaving the controlled premises (e.g., a retail store, library, etc.) or a space in which the article must be placed to be read and identified. A tag having a resonant (integrated) circuit is attached to each such article, and the presence of the tag circuit in the controlled area is sensed by a receiving system that detects the tag and processes information obtained therefrom (e.g., determines unauthorized removal of an article or the identity of goods in a container labeled with the tag). Many tags that operate on these principles are single-use or disposable tags, and are therefore designed to be produced at low cost in very large volumes. Other tags or devices (such as "smart" cards for identification or automatic payment applications) can be re-used many times.

Alternatively, the present tag may comprise a sensor. In many sensor applications, the RF signal modulation characteristics and/or properties of the sensor change as the characteristics and/or properties of the object or article to which it is attached change. For example, the present sensor may be attached to a stainless steel (or other metal) object, structure or surface. As the properties of the object, structure or surface change (e.g., the steel oxidizes, a metal having electromagnetic properties becomes magnetized or carries a minimum threshold electrical current, or the object or surface [regardless of its composition] changes temperature by a predetermined difference or a threshold amount), the characteristics and/or properties of the RF signal radiated, reflected or modulated by the present sensor also change in a detectable manner.

In addition, the present wireless tag may have circuitry configured to process signals for one or more displays and/or optical indicators. As a result, the present tag may further include a display (e.g., an LCD, LED or other display), an optical, tactile and/or auditory indicator (such as a light, buzzer or speaker), and/or driver circuits for such display circuits and/or indicators.

The present tags may be used (and, if desired and/or applicable, re-used) in any commercial EAS and/or RFID application and in essentially any frequency range for such applications. For example, the present tags may be used at the frequencies, and in the fields and/or ranges, described in Table 1 below:

TABLE 1

Exemplary applications.

| Frequencies | Preferred Frequencies | Range/Field of Detection/ Response | Preferred Range/Field of Detection/ Response | Exemplary Commercial Application(s) |
|---|---|---|---|---|
| 100-150 KHz | 125-134 KHz | up to 10 feet | up to 5 feet | animal ID, car anti-theft systems, beer keg tracking |
| 5-15 MHz | 8.2 MHz, 9.5 MHz, 13.56 MHz | up to 10 feet | up to 5 feet | inventory tracking (e.g., libraries, apparel, auto/motorcycle parts), building security/access |
| 800-1000 MHz | 868-928 MHz | up to 30 feet | up to 18 feet | pallet and shipping container tracking, shipyard container tracking |
| 2.4-2.5 GHz | about 2.45 GHz | up to 30 feet | up to 20 feet | auto toll tags |

CONCLUSION/SUMMARY

Thus, the present invention provides wireless devices (e.g., sensors and EAS, RF, HF, VHF and UHF ID tags) having an integrated circuit and a directly printed antenna and/or inductor, and methods for their manufacture and use. The device generally comprises (a) an integrated circuit on a substrate; and (b) an antenna, directly on the substrate and/or the integrated circuit, in electrical communication with the integrated circuit. The method of manufacturing a device generally comprises (1) forming an integrated circuit on a substrate; and (2) printing an antenna or antenna precursor layer on the integrated circuit and/or the substrate, the antenna being in electrical communication with the integrated circuit.

The present invention advantageously provides a low cost RF and/or RFID tag capable of standard applications and operations using conventional RF, RFID and/or EAS equipment and systems. By reducing the number of expensive and/or low throughput attachment steps, as well as reducing the cost of fabricating the active electronics, a low cost tag may be produced by directly printing at least part of an antenna or antenna precursor layer on an integrated circuit and/or a substrate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of manufacturing a device, comprising:
 a) forming an integrated circuit comprising at least one patterned conductor thin film, at least one patterned semiconductor thin film and at least one patterned insulating thin film on a first substrate; and
 b) printing an antenna or antenna precursor layer on the integrated circuit or on both the first substrate and the integrated circuit, at least part of the antenna being printed on the integrated circuit, and the antenna being in electrical communication with the integrated circuit.

2. The method of claim 1, wherein the integrated circuit comprises a printed integrated circuit (PIC).

3. The method of claim 2, wherein forming the PIC on the first substrate comprises printing at least one first layer of a first conductor precursor material or a first semiconductor precursor material in a first pattern on the first substrate.

4. The method of claim 3, wherein forming the PIC on the substrate further comprises printing a second layer of a second material in a second pattern on or above the first pattern.

5. The method of claim 4, wherein the second material comprises a dielectric precursor, the first conductor precursor material comprises a first metal precursor, and the first semiconductor precursor material comprises a first silicon precursor.

6. The method of claim 2, further comprising, after forming the PIC on the first substrate, attaching the first substrate to a second substrate, the second substrate having a greater area than the first substrate.

7. The method of claim 2, wherein printing the antenna or antenna precursor layer on the integrated circuit comprises printing a first portion of the antenna on the PIC and a second portion of the antenna on the first substrate.

8. The method of claim 2, wherein printing the antenna or antenna precursor layer comprises:
 a) printing an antenna precursor layer on the PIC and the first substrate; and
 b) plating a metal conductor on the antenna precursor layer to form the antenna.

9. The method of claim 1, wherein printing the antenna or antenna precursor layer comprises:
 a) depositing a precursor ink on the integrated circuit and the first substrate in a predetermined pattern;
 b) curing a precursor in the precursor ink to form a metal precursor; and
 c) annealing the metal precursor to form the antenna.

10. The method of claim 2, wherein printing the antenna or antenna precursor layer comprises printing the antenna or the antenna precursor layer on the PIC.

11. The method of claim 2, wherein the PIC comprises an uppermost passivation layer having first and second openings therein, exposing first and second conductive surfaces configured to enable electrical communication with the PIC, and first and second ends of the antenna or the antenna precursor layer are printed onto the first and second conductive surfaces.

12. The method of claim 3, wherein printing the at least one first layer comprises screen printing, flexographic printing, or gravure printing.

13. A device, comprising:
   a) an integrated circuit on a first substrate, the integrated circuit comprising at least one patterned conductor thin film, at least one patterned semiconductor thin film and at least one patterned insulating thin film; and
   b) a printed antenna, at least part of which is directly on the integrated circuit, in electrical communication with the integrated circuit.

14. The device of claim 13, wherein the integrated circuit comprises a printed integrated circuit (PIC).

15. The device of claim 14, further comprising a plurality of pads on the PIC, in electrical communication with the PIC, each pad also being in electrical communication with an end of the antenna.

16. The device of claim 15, wherein the at least one semiconductor thin film comprises a silicon layer in a first pattern on the first substrate, the at least one insulating thin film comprises a dielectric layer in a second pattern on or above the silicon layer, and the at least one conductor thin film comprises a metal in a third pattern on or above the first substrate, the first pattern and/or the second pattern.

17. The device of claim 13, further comprising a second substrate supporting the integrated circuit and having a smaller area than the first substrate, the second substrate being attached to the first substrate.

18. The device of claim 13, wherein the antenna comprises:
   a) a seed layer in an antenna pattern on the integrated circuit and the first substrate; and
   b) a metal conductor on the seed layer.

19. The device of claim 14, wherein the at least one insulating thin film comprises an uppermost passivation layer having first and second openings therein, exposing first and second conductive surfaces in electrical communication with the PIC, and first and second ends of the antenna or the antenna precursor layer are in contact with the first and second conductive surfaces.

20. The device of claim 19, wherein the PIC has an area similar to or larger than the antenna.

* * * * *